United States Patent
Kajiwara

[11] Patent Number: 5,234,071
[45] Date of Patent: Aug. 10, 1993

[54] TRAVEL CONTROL APPARATUS FOR MOTOR A VEHICLE

[75] Inventor: Yasuya Kajiwara, Himeji, Japan

[73] Assignee: Mitsubishi Denki Kabushiki Kaisha, Tokyo, Japan

[21] Appl. No.: 841,029

[22] Filed: Feb. 25, 1992

[30] Foreign Application Priority Data

Feb. 26, 1991 [JP] Japan .................................. 3-030716

[51] Int. Cl.$^5$ .......................... B60T 7/16; B60K 31/02
[52] U.S. Cl. .................................... 180/169; 180/170; 180/178; 364/426.04
[58] Field of Search ............... 180/167, 169, 170, 178, 180/179; 364/426.04, 426.01

[56] References Cited

U.S. PATENT DOCUMENTS

| | | | |
|---|---|---|---|
| 4,519,469 | 5/1985 | Hayashi et al. | 180/169 |
| 4,621,705 | 11/1986 | Etoh | 180/169 |
| 4,703,429 | 10/1907 | Sakata | 180/169 X |
| 4,931,937 | 6/1990 | Kakinami et al. | 180/169 X |
| 4,947,952 | 8/1990 | Kajiwara | 180/178 |
| 4,961,146 | 10/1990 | Kajiwara | 364/426.04 |
| 4,969,103 | 11/1990 | Maekawa | 364/426.04 |

FOREIGN PATENT DOCUMENTS 38760 8/1987 Japan .

Primary Examiner—David M. Mitchell
Assistant Examiner—Peter C. English
Attorney, Agent, or Firm—Sughrue, Mion, Zinn, Macpeak and Seas

[57] ABSTRACT

An automatic speed control apparatus capable of allowing a motor vehicle to travel at a given speed in a cruising mode over a wide speed range from a low to a high speed by simplifying driver's operation as required while ensuring safety in driving by protecting the vehicle against collision with an obstacle lying in front thereof. Upon stoppage of acceleration and deceleration of the vehicle, the apparatus makes the vehicle cruise at a speed at which the vehicle was travelling at the instant when the acceleration or deceleration was stopped. In addition, upon detection of an obstacle such as a preceding car, an alarm is generated, and the vehicle is controlled such that the distance to the object is maintained at a constant level, as required.

4 Claims, 10 Drawing Sheets

$t = t_0 + \delta t$

TRAVEL CONTROL APPARATUS FOR MOTOR A VEHICLE

BACKGROUND OF THE INVENTION

The present invention relates to a travel control apparatus for a motor vehicle or car. More particularly, the invention is concerned with a travel control apparatus which is capable of controlling not only a cruise speed and a creep speed but also the speed of a vehicle which is following a preceding car with a proper distance thereto so as to assure safety in driving.

For vehicle speed control, there have been known a cruise control apparatus which maintains the speed of a vehicle constant at high speeds and a creep control apparatus which keeps the vehicle speed constant at low speeds. The creep control apparatus is especially advantageous when travelling in congested traffic for long periods of time, when parking a vehicle in a garage, or when passing another vehicle along a narrow road. However, the vehicle speed control systems known heretofore suffer from a disadvantage that the driver can not freely control the vehicle speed which is set in advance.

Figure 15:
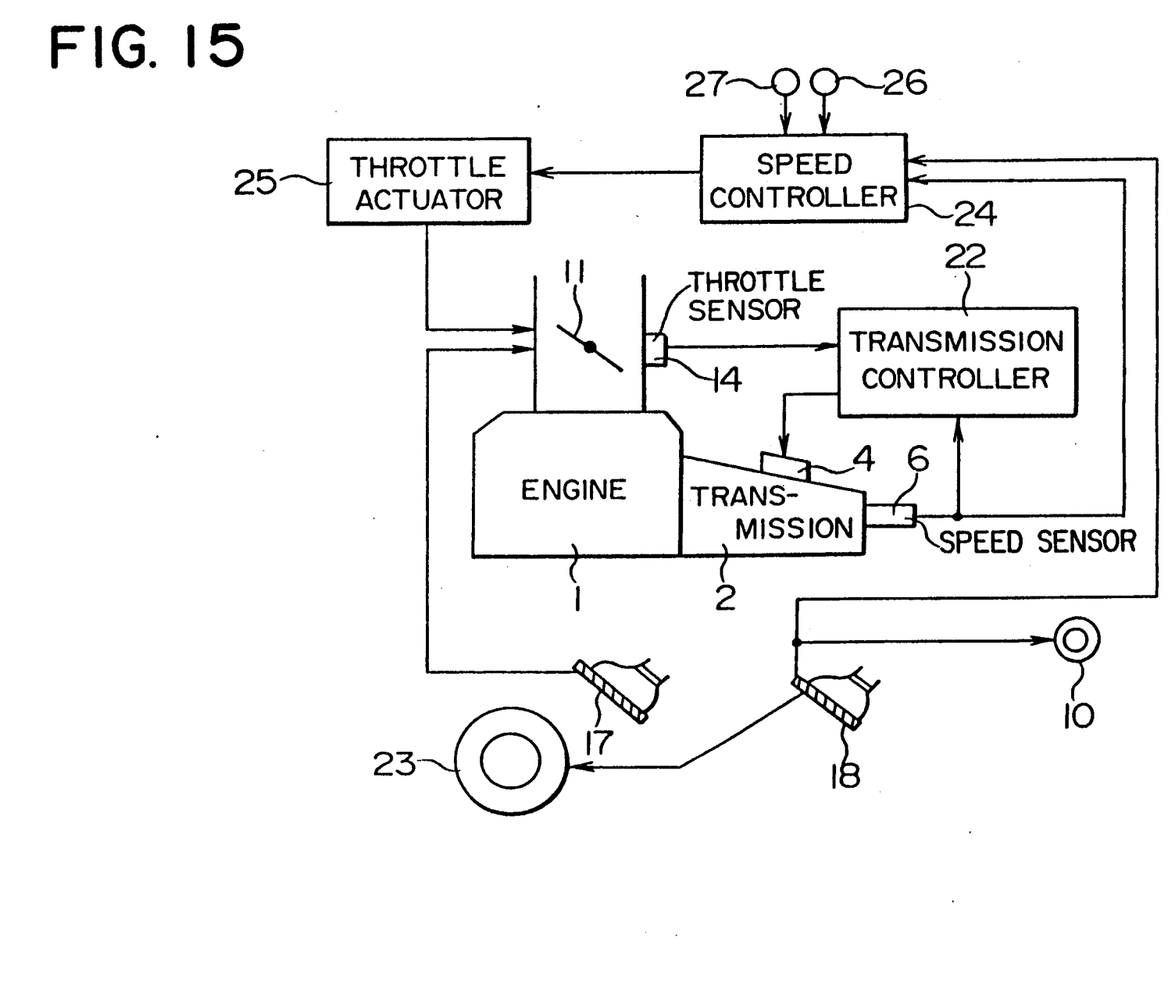
FIG. 15 is a block diagram showing the structure of a known vehicle travel control apparatus; and FIG, 16 is a block diagram showing another known vehicle travel control apparatus.

For a better understanding of the background of the invention, a vehicle travel control apparatus known heretofore will first be described in detail by referring to FIG. 15. An internal combustion engine, generally denoted by reference numeral 1, is equipped with an intake pipe in which a throttle valve 11 is mounted for adjusting or regulating the output torque of the engine. The opening degree of the throttle valve 11 is sensed by a throttle opening sensor 14. The engine 1 has an output shaft which is coupled to a transmission 2 such as a torque converter. A gear change actuator 4 is installed in association with the transmission 2 for changing the gear ratio thereof. A vehicle speed sensor 6 is provided for sensing the vehicle speed on the basis of the rotational speed of an output shaft of the transmission 2. Output signals from the throttle opening sensor 14 and the vehicle speed sensor 6 are input to a transmission controller 22 which is adapted to determine the gear ratio of the transmission 2 on the basis of these signals to thereby control the gear change actuator 4. Further provided are an accelerator pedal 17, a brake pedal 18, a brake lamp 10 and a brake system 23 for applying a braking force to wheels of the vehicle. For the purpose of controlling the vehicle speed at a constant level, a speed controller 24 is provided which controls a throttle actuator 25. Reference numeral 26 denotes a cruise speed setting switch for setting the cruise speed of the vehicle, and reference numeral 27 denotes a set speed changing switch for changing the cruise speed as set by the switch 26.

Operation of the above-mentioned vehicle travel control apparatus will be described below. When the driver depresses the accelerator pedal 17, the throttle valve 11 is opened, as a result of which the output torque of the engine 1 increases. In other words, the vehicle speed can be adjusted or regulated by controlling the opening degree of the throttle valve 11 through the accelerator pedal 17. The transmission 2 serves to transmit the output torque of the engine 1 to the driving wheels of the vehicles with a reduction ratio which is arithmetically determined by the transmission controller 22 on the basis of the output signals of the throttle opening sensor 14 and the vehicle speed sensor 6. The output of the transmission controller 22 is supplied to the gear change actuator 4 which serves to set the gear ratio of the transmission 2 at a value determined by the transmission controller 22.

When the driver desires to cruise the vehicle at a current speed, he or she operates the speed set switch 26. In response, the speed controller 24 stores the current vehicle speed and controls the throttle actuator 25 such that the current speed is maintained by holding the current opening degree of the throttle valve 11. For releasing the vehicle from the constant speed mode, the driver depresses the brake pedal 18. Depression of the brake pedal 18 is detected by the speed controller 24 which then issues to the throttle actuator 25 a command to fully close the throttle valve 11. At the same time, depression of the brake pedal 18 actuates the brake system 23 while lighting the brake lamp 10 to send a message of deceleration to a succeeding car running behind the vehicle of concern. When the vehicle is to be restored to the set speed, the driver accordingly manipulates the switch 26. Further, when the set speed is to be changed during travel of the vehicle, the speed change switch 27 is operated to accelerate or decelerate the vehicle speed.

Figure 16:
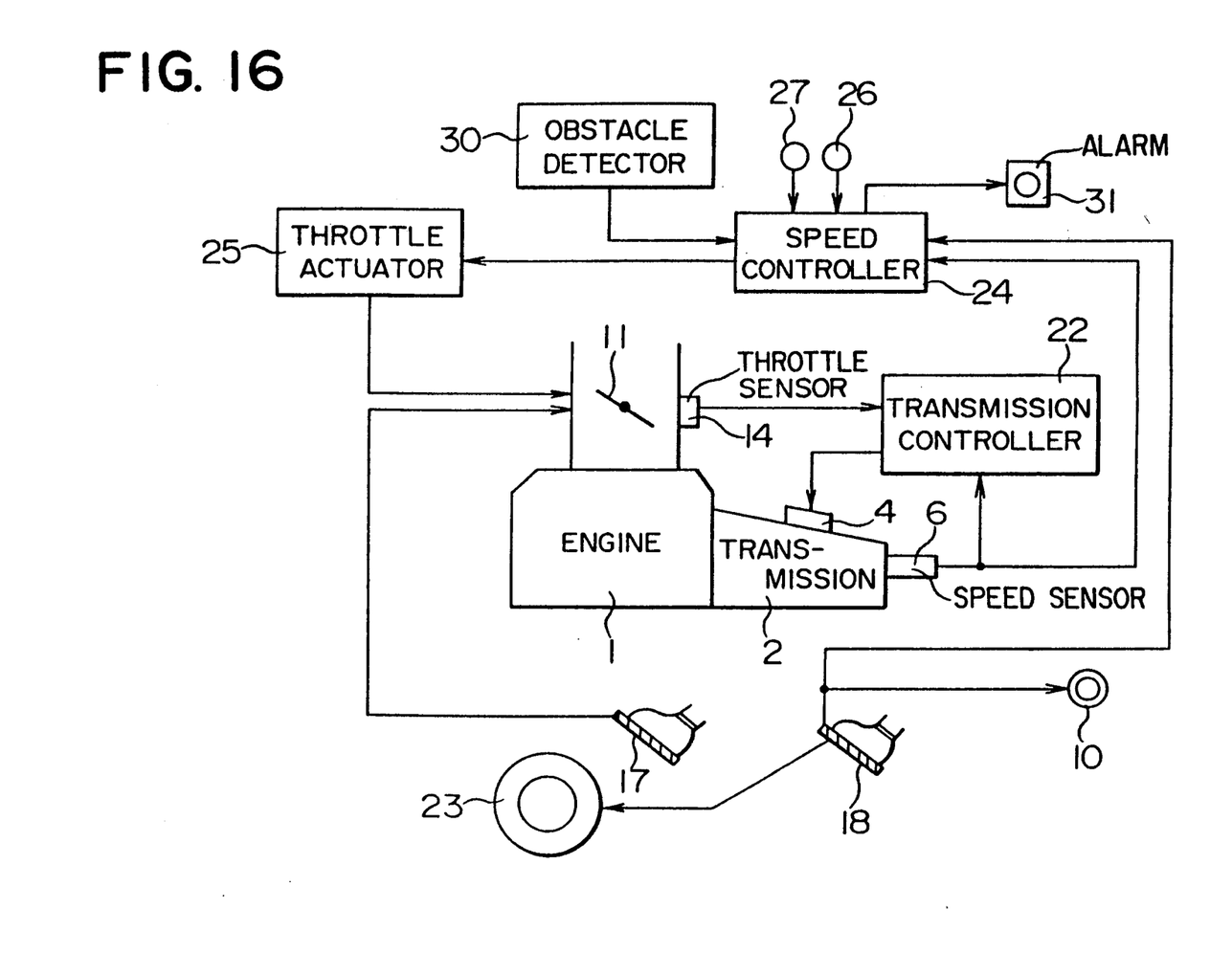

FIG. 16 shows another known vehicle travel control apparatus. As can be seen from this figure, the known apparatus differs from the one shown in FIG. 15 in that an obstacle detector 30 and an alarm 31 are additionally provided. When an obstacle is detected by the obstacle detector 30 during travel of a vehicle, an obstacle detection signal is supplied to the speed controller 24 to thereby trigger the alarm 31 which then generates an alarm to alert the presence of the obstacle to the driver.

The vehicle travel control apparatuses described above suffers from various disadvantages. First, a cruising command is generated through manipulation of the speed setting switch 26 by the driver, and in order to change the cruising speed once set, the driver is required to manipulate the speed change switch 27 or the driver has to once clear the cruising mode and set again that mode with a new cruising speed. Thus, troublesome manipulations are imposed on the part of the driver, which is obviously undesirable from the view point of safety in driving. Furthermore, because only the output torque of the engine is controlled, such an unwanted situation may happen that the engine output torque becomes insufficient for uphill travel or the speed adjustment becomes impossible in the course of downhill travel. Besides, at a very low speed, the travel control itself will be rendered impossible.

It must further be pointed out that the running speed of the vehicle can be maintained unchanged even when the vehicle is approaching an obstacle such as a preceding car, thus causing a fear of collision.

SUMMARY OF THE INVENTION

In the light of the state of art described above, it is an object of the present invention to provide a novel and improved travel control apparatus for a motor vehicle which is essentially immune to the disadvantages of the above-mentioned known control apparatuses and which can assure safety in operation of a motor vehicle by simplifying and facilitating manipulations which are required to be performed by the driver.

Another object of the invention is to provide a novel and improved travel control apparatus for a motor vehicle which can allow a motor vehicle to run at a cruising speed which is arbitrarily selected from a wide speed range from a very low to a high speed, while facilitating speed change in the course of cruising a vehicle.

A further object of the invention is to provide a novel and improved travel control apparatus for a motor vehicle which has a function of protecting a motor vehicle from collision with an obstacle such as a preceding car running ahead thereof.

In view of the above and other objects which will become apparent as description proceeds, there is provided according to the present invention a travel control apparatus for a motor vehicle which comprises means for generating an acceleration command in response to driver's acceleration operation; means for generating a deceleration command in response to driver's deceleration operation; means for detecting the speed of the motor vehicle; and control means responsive to the acceleration command and the deceleration command for respectively accelerating and decelerating the motor vehicle, the control means being also operable to store the speed of the motor vehicle at the instant when the acceleration command or the deceleration command is terminated, and control the motor vehicle in such a manner that the speed of the vehicle is maintained at the stored speed upon termination of the acceleration or deceleration command.

In a preferred form, the vehicle travel control apparatus further comprises: means for detecting an obstacle on a road on which the vehicle is travelling; and means for generating an alarm upon detection of the obstacle.

In another preferred form, the vehicle travel control apparatus further comprises: means for detecting a distance to an obstacle located within a predetermined range in front of the motor vehicle; and means for controlling the distance between the motor vehicle and the obstacle when and after the driver stops the acceleration of deceleration operation if the distance to the obstacle becomes smaller than a predetermined value during the time when the motor vehicle is travelling at a speed lower than a predetermined value.

In a further preferred form, the vehicle travel control apparatus further comprises: a distance sensor for detecting a preceding vehicle and determining an inter-vehicle distance thereto; means for generating an alarm when the inter-vehicle distance decreases below a predetermined value; and a confirmation switch adapted to be operated by the driver when the inter-vehicle distance becomes smaller than a predetermined value, to select an inter-vehicle distance control mode in which the distance to the preceding vehicle is automatically maintained constant. The controller is responsive to an operation of the confirmation switch for maintaining the inter-vehicle distance at a constant level while allowing the motor vehicle to follow the preceding vehicle.

With the structures of the travel control apparatus described above, the motor vehicle can be accelerated or decelerated in response to an acceleration or deceleration command. When the acceleration or deceleration command is cleared or terminated, the motor vehicle is controlled to continue to travel at a current speed at which the vehicle is travelling at the instant when the acceleration or deceleration command is terminated.

When an obstacle such as a preceding vehicle is detected during travel of the motor vehicle, an alarm is generated. In addition, when the distance to the obstacle decreases below a predetermined value at a vehicle speed lower than a predetermined value in a state where the acceleration or deceleration command is disabled or terminated, distance control for controlling the distance between the motor vehicle and the obstacle is performed to protect the former against collision with the latter. When the distance between the motor vehicle of concern and the preceding vehicle decreases below a predetermined value, and alarm is generated. At that time, the motor vehicle is controlled to follow the preceding vehicle while maintaining a predetermined distance therebetween, as required, after the alarm is confirmed by the driver. Thus, collision of the motor vehicle with an obstacle located in front thereof can positively be evaded because the inter-vehicle distance is automatically controlled when the motor vehicle approaches the preceding vehicle at a speed lower than a predetermined value.

The above and other objects, features and advantages of the present invention will better be understood upon reading the following description of preferred embodiments taken, by way of example only, in conjunction with the accompanying drawings.

DESCRIPTION OF THE PREFERRED EMBODIMENTS

The present invention will now be described in detail in conjunction with preferred or exemplary embodiments thereof by reference to the accompanying drawings.

Figure 1:
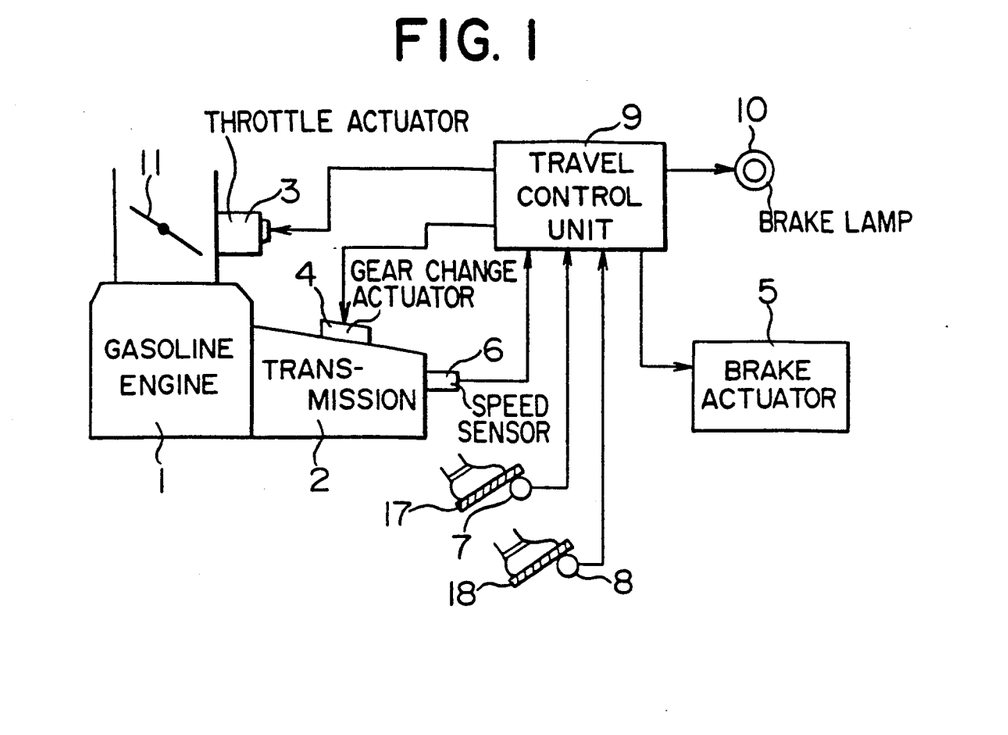
FIG. 1 is a schematic block diagram showing a travel control apparatus for a motor vehicle according to a first embodiment of the invention.

Referring to FIG. 1, which schematically shows the general structure of a vehicle travel control apparatus according to a first embodiment of the invention, an internal combustion engine 1 of a motor vehicle is equipped with an air intake pipe in which a throttle valve 11 is pivotally mounted. The throttle valve 11 is opened and closed by means of a throttle actuator 3 which may be constituted by a controllable electric motor. On the other hand, the operation of the throttle actuator 3 is controlled by a travel control unit 9 which can be implemented by a microcomputer and which is also in charge of controlling a brake actuator 5 for operating a brake system (not shown) and a gear change actuator 4 which controls a transmission 2 such as a torque converter type transmission or the like, as well as for lighting a brake lamp 10. For the purpose of performing the above-mentioned controls, the travel control unit 9 has a plurality of input terminals, which are supplied with various signals including an output signal of an accelerator pedal depression sensor 7 which is installed for sensing the operation of an accelerator pedal 17, an output signal of a brake pedal depression sensor 8 which senses the operation of a brake pedal 18, and an output signal of a vehicle speed sensor 6 which is mounted on an output shaft of the transmission 2 for sensing the speed of the motor vehicle, respectively.

In operation of the vehicle travel control apparatus of the structure described above, the throttle actuator 3, the gear change actuator 4 and the brake actuator 5 are operated under the control of the travel control unit 9, wherein the throttle actuator 3 drives the throttle valve 11 to thereby adjust the output torque of the engine. More specifically, when the driver depresses the accelerator pedal 17, an output signal of the accelerator pedal depression sensor 7 indicative of the amount of accelerator pedal depression is input to the travel control unit 9 which controls, in response thereto, the throttle actuator 3 to increase the opening degree of the throttle valve 11 for increased engine output. Further, the travel control unit 9 processes the output signals from the vehicle speed sensor 6 and the accelerator pedal depression sensor 7 to thereby decide whether engine driving torque is sufficient, for example, for uphill travel of the vehicle. If the answer to this question is negative (i.e., when the torque is inadequate), the gear change actuator 4 is operated to increase the gear ratio of the transmission 2.

When the accelerator pedal 17 is released by the driver upon the desired vehicle speed having been reached, the travel control unit 9 fetches and stores the current vehicle speed at that time point and controls the throttle actuator 3, the gear change actuator 4 and the brake actuator 5 on the basis of the stored vehicle speed data so that the current vehicle speed can be maintained (cruising mode). In downhill travel, for example, the throttle valve 11 is progressively closed. In that case, when the actual vehicle speed exceeds a predetermined speed notwithstanding the fact that the throttle valve 11 is fully closed, the gear change actuator 4 operates to increase the gear ratio of the transmission 2 to thereby provide the so-called engine brake. When the actual vehicle speed still exceeds the predetermined speed regardless of activation of the engine brake, the brake actuator 5 is then operated to actuate the brake system 23.

On the other hand, when the vehicle is to be decelerated, the brake pedal 18 is depressed by the driver. This depression of the brake pedal 18 is sensed by the brake pedal depression sensor 8 whose output signal is then input to the travel control unit 9, which controls, in response thereto, the various actuators 3, 4 and 5 to correspondingly decelerate the vehicle. When the brake pedal 18 is released from depression upon a desired or target vehicle speed having been reached, the travel control unit 9 again fetches and stores the vehicle speed at that time point to thereby control the individual actuators 3, 4 and 5 so that the motor vehicle can run at the speed as stored (cruising mode). Further, when the motor vehicle is brought to stop by driver's depression of the brake pedal 18 and the brake pedal 18 is then released, the travel control unit 9 controls the throttle actuator 3 to fully close the throttle valve 11 as well as the brake actuator 5 to maintain the brake system in the actuated state with the gear ratio being held at a maximum value (the lowest gear). In the case of an automatic transmission such as a well-known torque converter type transmission, there may take place such a creep phenomenon that the motor vehicle starts to run at a low speed when the brake pedal 18 is released. Such creeping can be positively prevented by the vehicle travel control apparatus according to the instant embodiment of the invention in the above manner.

When the vehicle is decelerated, a brake lamp 10 connected to an output terminal of the travel control unit 9 is illuminated to thereby issue a message of deceleration to a succeeding motor vehicle running behind.

Figure 2:
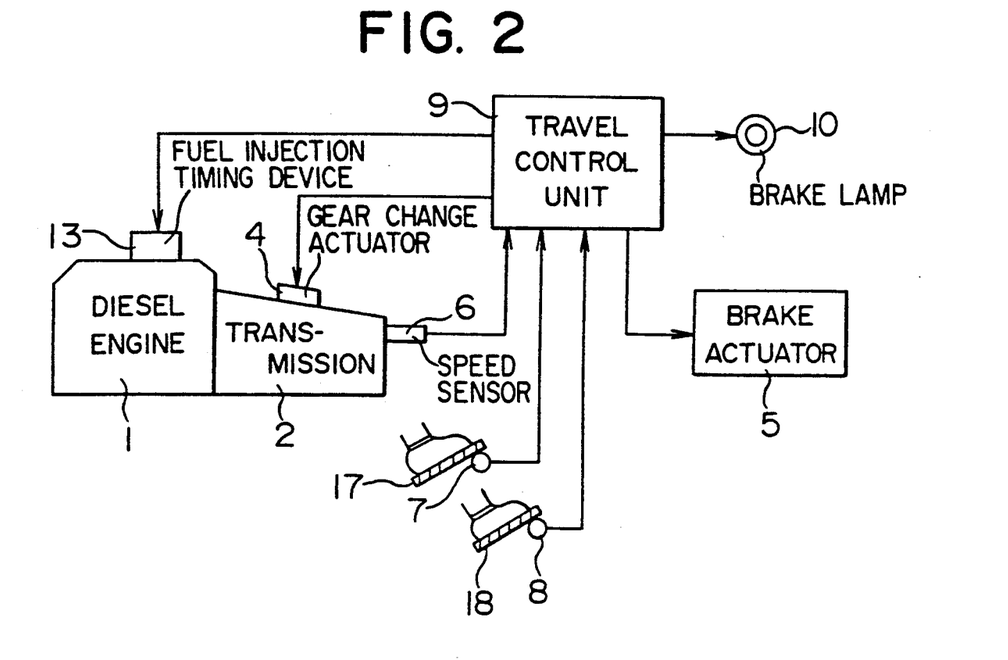
FIG. 2 is a view similar to FIG, 1, schematically showing the general structure of a vehicle travel control apparatus according to a second embodiment of the invention.

The above description has been made mainly with reference to travel control of a motor vehicle driven by a gasoline engine. In the case of a motor vehicle having a diesel engine installed, however, the travel control apparatus has to be so modified as illustrated in FIG. 2, which shows a second embodiment of the invention. Referring to FIG. 2, it will be seen that the throttle actuator 3 and the throttle valve 11 are replaced by a fuel injection timing device 13 for controllably setting the fuel injection timing to thereby control the output torque of the engine 1. The fuel injection timing device 13 is also placed under the control of the travel control unit 9 for realizing the same speed control as in the case of the first embodiment of the invention.

Figure 3:
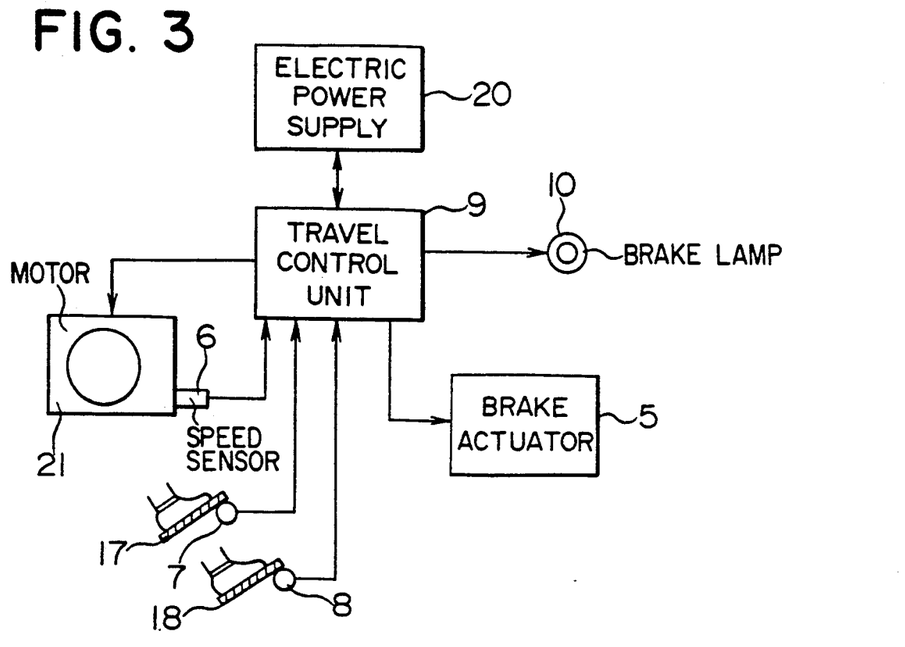
FIG. 3 schematically shows the structure of a vehicle travel control apparatus according to a third embodiment of the invention.

FIG. 3 shows a travel control apparatus according to a third embodiment of the invention which is intended to be applied to a motor vehicle in which an electric motor 21 and an electric power supply 20 are employed in place of the gasoline engine 1 and the transmission 2 of FIG. 1. With the arrangement of the travel control apparatus shown in FIG. 3, vehicle speed control can be carried out substantially in the same manner as described previously. More specifically, the travel control unit 9 is so designed or programmed as to increase an input electric power supplied to the electric motor 21 in dependence upon the output signal of the accelerator pedal depression sensor 7 and adjust the output torque of the electric motor 21 so that the current vehicle speed prevailing upon release of the accelerator pedal can be maintained. However, when the brake has to be activated as in the case of downhill travel, the electric motor 21 is controlled to operate as an electric generator for regenerating the power supply 20 or alternatively as a heat dissipator for dissipating the regenerated power as heat. If the braking effort is nevertheless inadequate, then the brake system 23 is activated by the brake actuator 5. When the motor vehicle is to be stopped, the electric motor 21 is deenergized with the brake system (not shown in FIG. 3) being held actuated.

Figure 4:
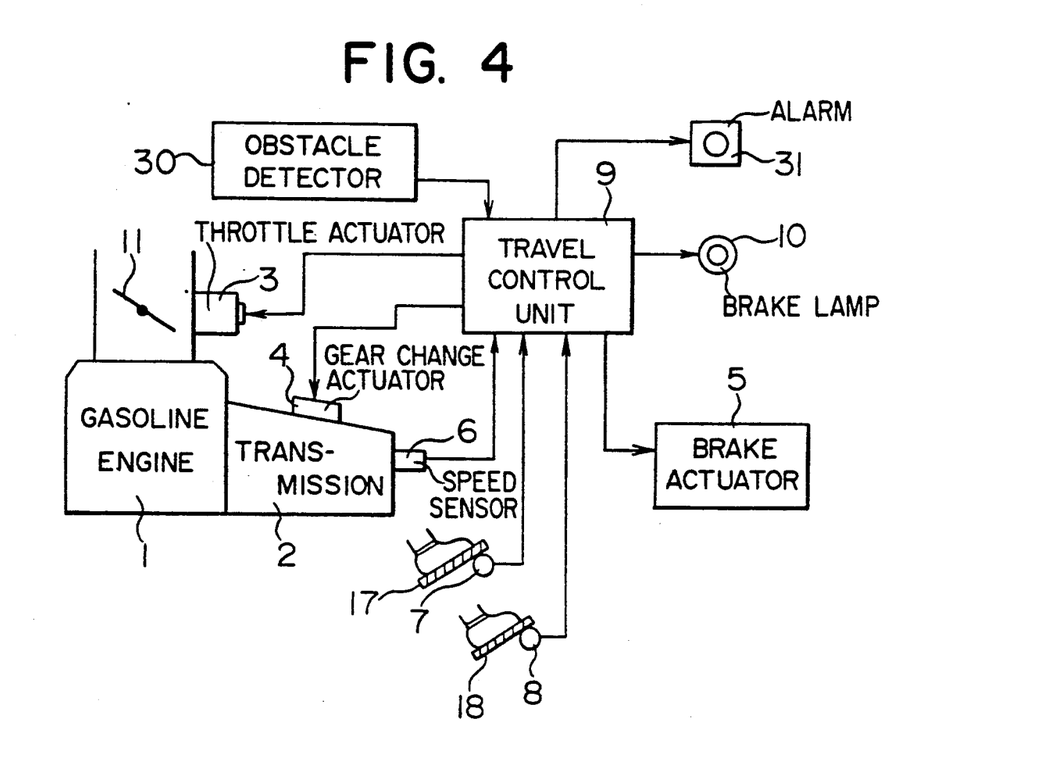
FIG. 4 schematically shows the structure of a vehicle travel control apparatus according to a fourth embodiment of the invention.

FIG. 4 shows a vehicle travel control apparatus according to a fourth embodiment of the present invention, which differs from the apparatus of FIG. 1 in that an obstacle detector 30 and an alarm 31 are additionally provided. The obstacle detector 30 is designed to detect an obstacle in the course of running such as a preceding car which is running ahead with a short distance, a car which is parking at a road side, and an oncoming car which is coming across on a curved road, for thereby activating the alarm 31 to alert the driver of the motor vehicle of concern.

Figure 5:
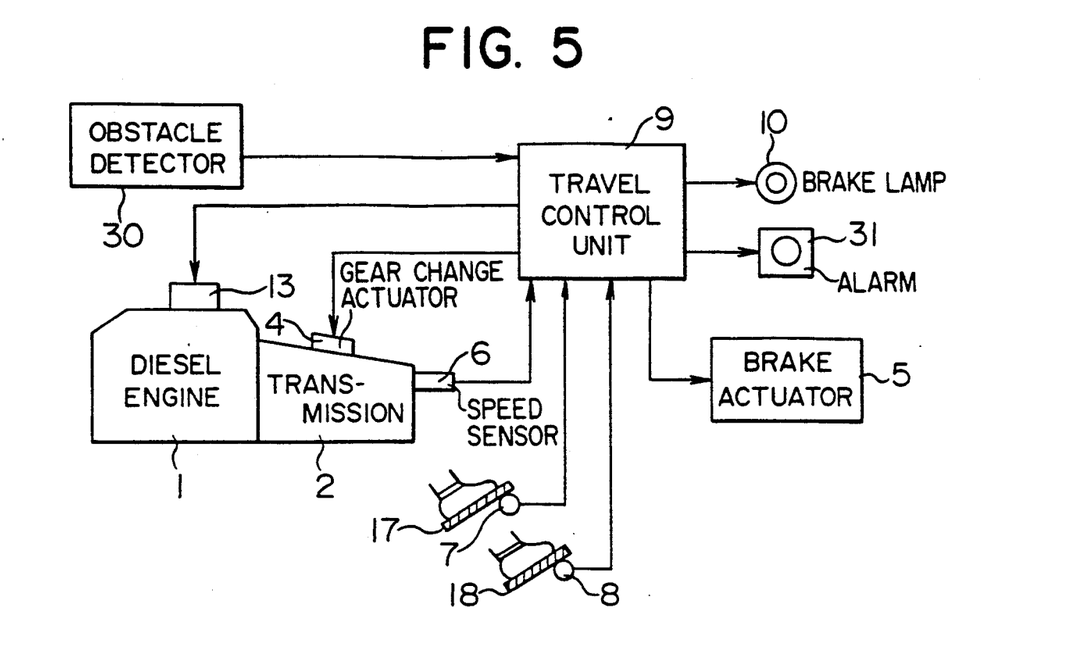
FIG. 5 schematically shows the structure of a vehicle travel control apparatus according to a fifth embodiment of the invention.
Figure 6:
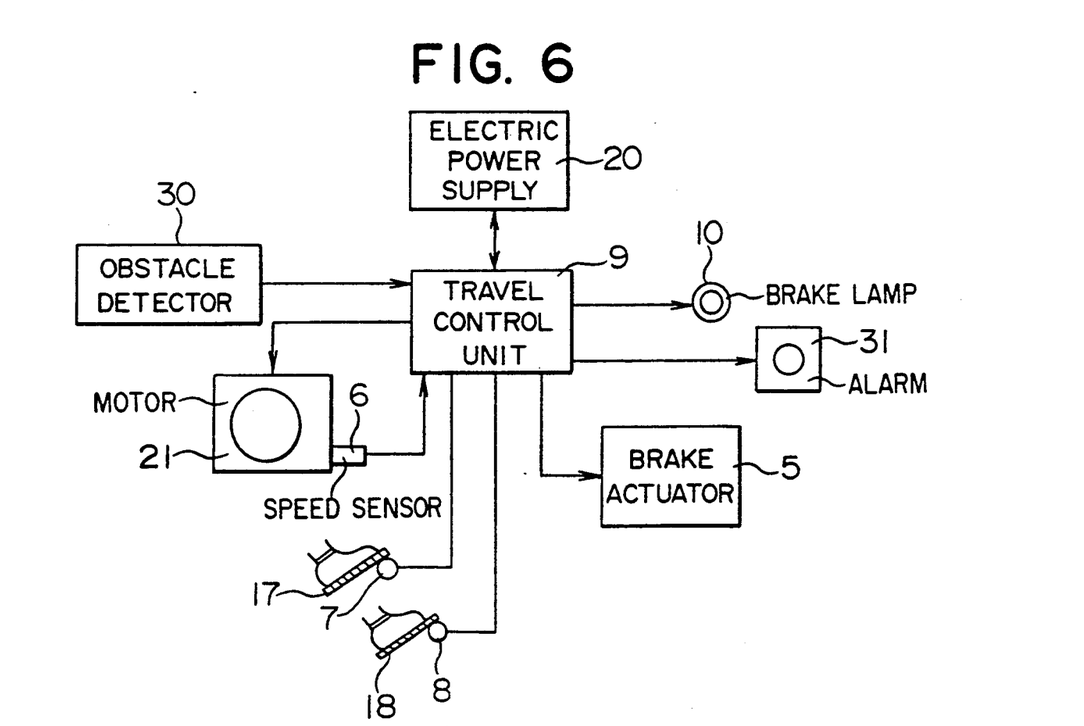
FIG. 6 schematically show the structure of a vehicle travel control apparatus according to a sixth embodiment of the invention.

FIGS. 5 and 6 show fifth and sixth embodiments, respectively, of the vehicle travel control apparatus according to the invention, which are similar to the second and third embodiments shown in FIGS. 2 and 3, respectively, except that an obstacle detector 30 and an alarm 31 are additionally provided in the vehicle travel control apparatuses of FIGS. 5 and 6. With the arrangements shown in these figures, safety in the driving of the motor vehicle can be increased by alerting the driver to an obstacle such a preceding car running ahead, as described above in conjunction with the fourth embodiment.

Figure 7:
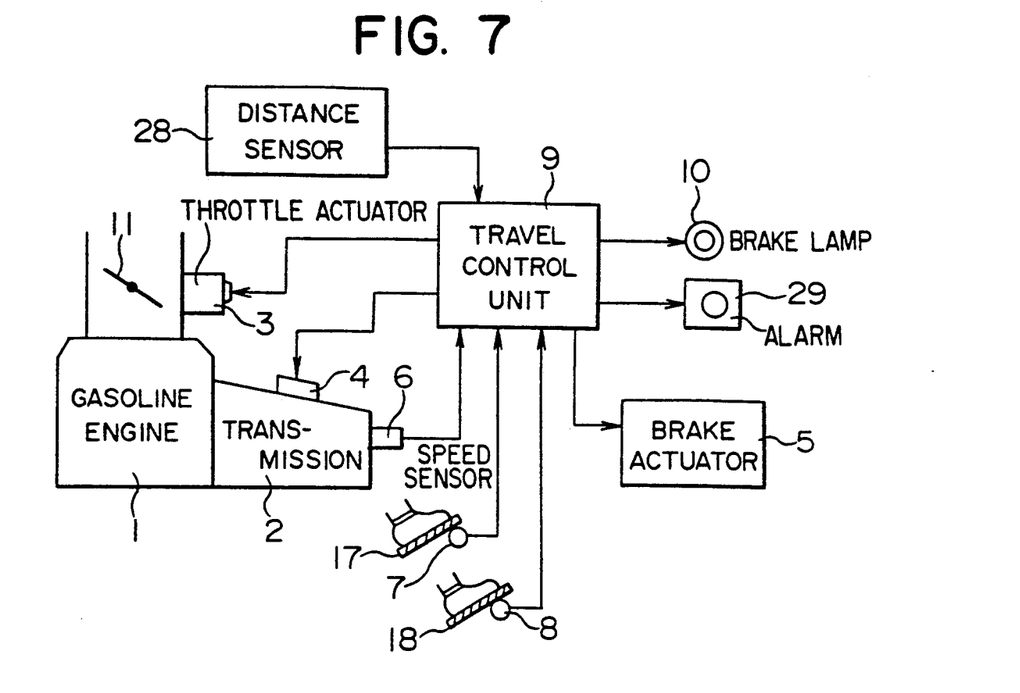
FIG. 7 schematically shows the structure of a vehicle travel control apparatus according to a seventh embodiment of the invention.

FIG. 7 schematically shows the structure of a vehicle travel control apparatus according to a seventh embodiment of the invention, which is substantially the same as that of the first embodiment except that a range sensor 28 for sensing the distance to an obstacle located within a predetermined range in front of the vehicle as well as an alarm 29 are provided.

Primary operation of the vehicle travel control apparatus according to the seventh embodiment is substantially the same as that of the first embodiment. When a preceding car is running at a very low speed due to congested traffic or in other like situations, the driver of the motor vehicle of concern will depress the brake pedal 18 to decrease the vehicle speed to a speed lower than 30 km/h, for example. In that case, when the distance sensor 28 senses a preceding car within a forward range of 30 m ahead, for example, then the travel control unit 9 responds to the output signal of the distance sensor 28 and generates relevant information to the alarm 29 for activation thereof. Thus, the driver will release the accelerator pedal 17 and the brake pedal 18. In that case, the travel control unit 9 controls the various actuators 3, 4 and 5 so that the inter-vehicle distance to the preceding car can be maintained by properly adjusting the vehicle speed, while enabling the motor vehicle of concern to follow the preceding car. When the latter speeds up to more than 30 km/h, the follow-up control is then invalidated, whereupon the inter-vehicle distance control is terminated.

When the driver depresses the accelerator pedal 17 at this time point, the vehicle speed will increase, so the motor vehicle of concern is approaching the preceding car. Accordingly, the driver again depresses the brake pedal to decrease the vehicle speed. The brake pedal 18 will again be released when the vehicle speed becomes lower than 30 km/h with the distance to the preceding car being within the range of 30 m. Thus, the distance based vehicle travel control is again effectuated, whereby the vehicle following control mode is realized by maintaining the distance to the preceding car at a predetermined constant level.

Upon stoppage of the preceding car, the motor vehicle of concern also automatically stops at a predetermined distance from the former. However, the motor vehicle can not be restarted unless the accelerator pedal 17 is depressed even when the preceding car restarts to run. Accordingly, in order to restart the motor vehicle of concern, the accelerator pedal 17 has to be depressed. When the vehicle speed has exceeded 30 km/h after restart of the vehicle, the vehicle is decelerated to the speed of 30 km/h, whereon the distance control running mode is validated to thereby allow the vehicle following control mode to be restored.

The range or distance sensor 28 is by no means novel and may be implemented by any conventional appropriate sensor. For example, an image of an object lying or running ahead of the vehicle of concern may be sensed by a pair of video cameras whose output signals are properly processed by a microcomputer to determine the distance to the object on the basis of the well-known trigonometric method. Another example would be that a light beam is projected by a light transmitter to an object and a reflected optical image is picked up by a photoelectric element array or an image sensor to thereby determine the distance to the object in accordance with the well-known trigonometric method. Besides, to this end, there may be adopted a radar type distance measurement system in which the distance to an object is determined by measuring the time taken for a light pulse to travel to and from the object. The range sensor 28 may be of a swingable type which can assure a wide field of view. Although the distance or range sensor 28 should preferably have a high resolution, a resolution of about ±3% is usually sufficient for practical applications.

Figure 8:
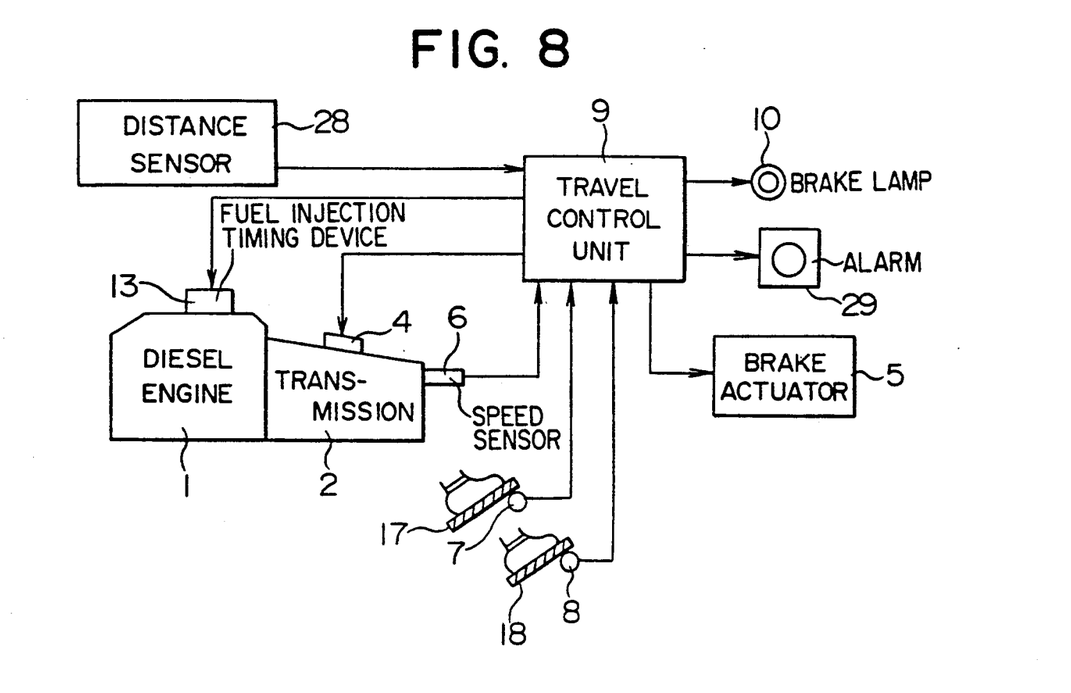
FIG. 8 schematically shows the structure of a vehicle travel control apparatus according to an eighth embodiment of the invention.
Figure 9:
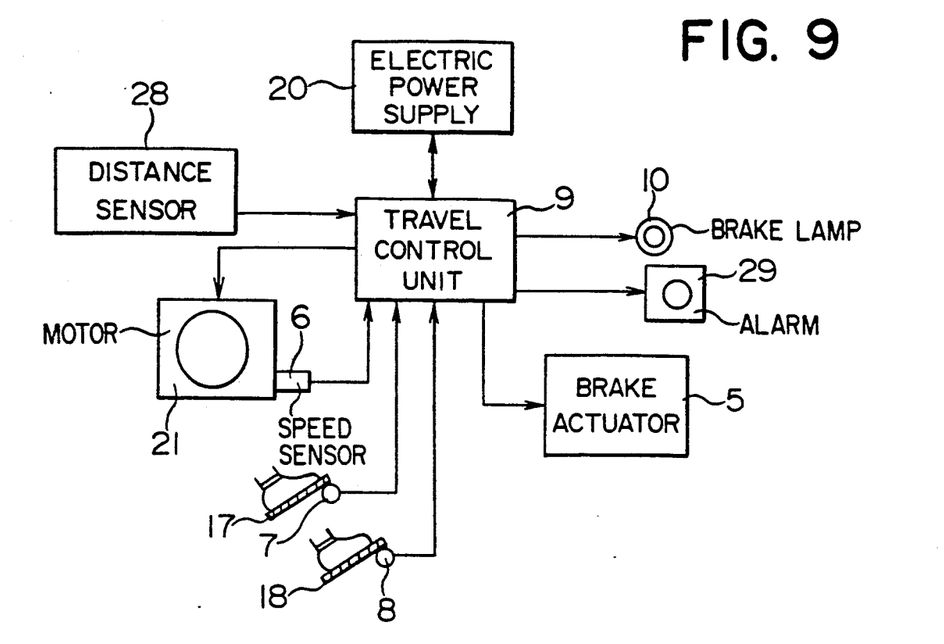
FIG. 9 schematically shows the structure of a vehicle travel control apparatus according to a ninth embodiment of the invention.

FIGS. 8 and 9 show the structures of vehicle travel control apparatuses according to an eighth and a ninth embodiment of the invention, respectively, which are substantially identical with the structures of the apparatuses according to the second and third embodiments, respectively, except that the inter-vehicle distance control function similar to that of the seventh embodiment is additionally provided.

Figure 10:
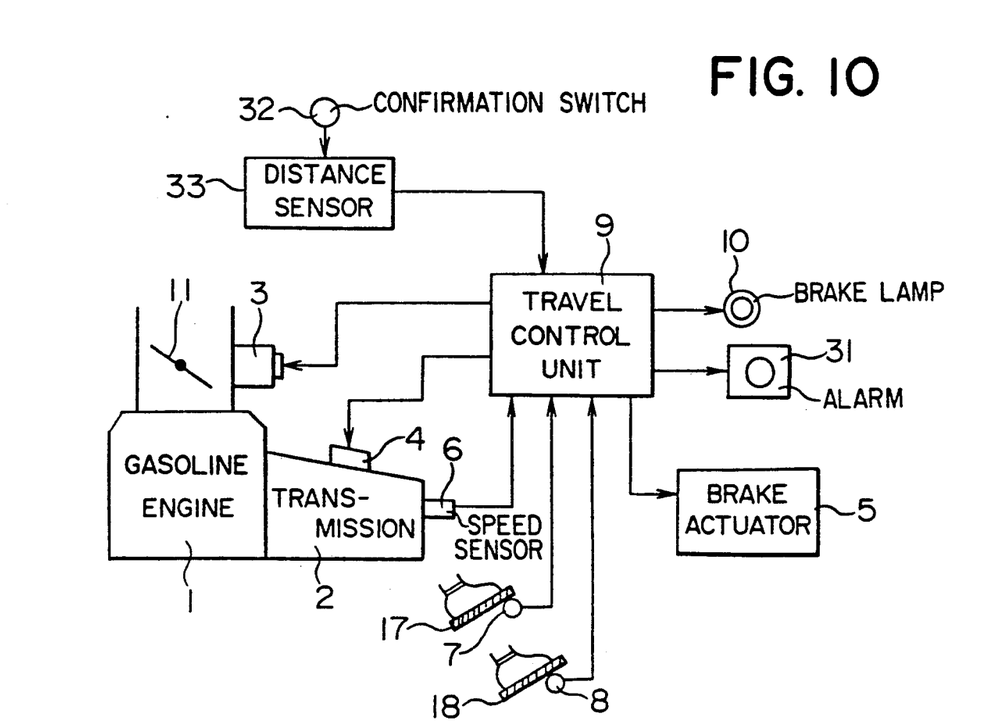
FIG. 10 schematically shows the structure of a vehicle travel control apparatus according to a tenth embodiment of the invention.

FIG. 10 shows the structure of a vehicle travel control apparatus according to a tenth embodiment of the invention. In this figure, reference numeral 33 denotes a tracking type distance sensor for detecting a preceding car running ahead and determining the distance thereto, and reference numeral 32 denotes a confirmation switch.

Operation of the vehicle travel control apparatus according to the instant embodiment differs from that of the first embodiment primarily in that the distance sensor 33 automatically recognizes a preceding car and determines the inter-vehicle distance to the preceding car. When the inter-vehicle distance thus measured becomes shorter than a predetermined value at a certain or predetermined vehicle speed, the travel control unit 9 decides that the distance to the preceding car is too short, and sends an alarm signal to the alarm 31 to alert the driver of the prevailing situation. At that time, the driver may decide to pass or follow the preceding car. When the confirmation switch 32 is actuated or turned on by the driver in such a situation, the operation of the travel control apparatus is switched over to a vehicle-following and vehicle-distance control mode. Thus, the vehicle is controlled to follow the preceding car while maintaining the predetermined inter-vehicle distance.

Figure 13:
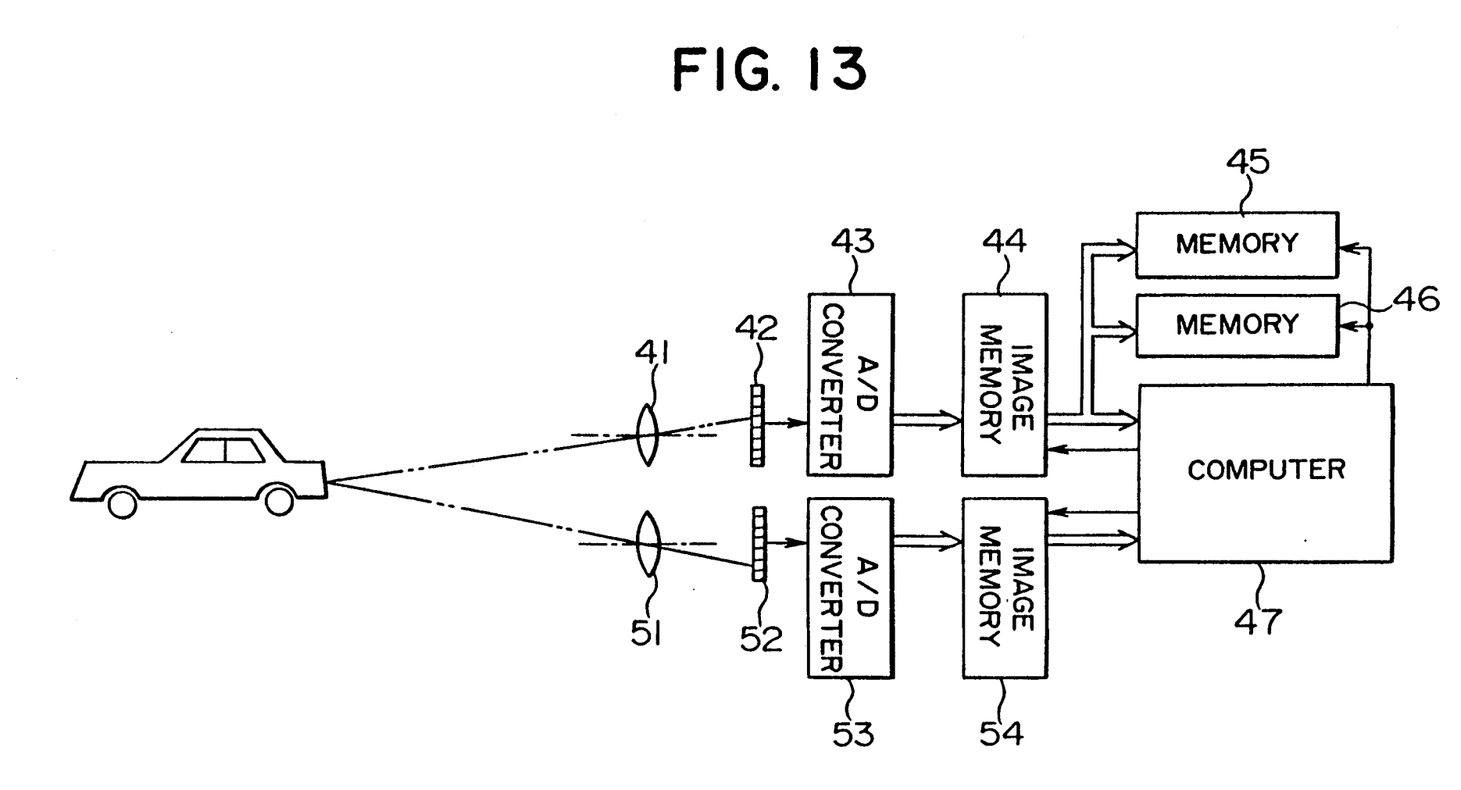
FIG. 13 is a diagram showing the structure of an inter-vehicle distance sensor according to an embodiment of the invention.

FIG. 13 shows the structure of the distance sensor 33 shown in FIG. 10 for sensing the inter-vehicle distance upon recognition of a preceding car. Referring to this figure, an image of a preceding car is formed by a pair of lenses 41 and 51 disposed in a vertically spaced relation, and it is converted into electric signals through image sensors 42 and 52, respectively. These electric signals are subsequently digitized by respective analogue-to-digital (A/D) converters 43 and 53 and stored in image memories 44 and 54, respectively. The image signals or data thus stored in the memories 44 and 54 subsequently undergo a variety of processings executed by a computer 47.

The processing for determining the presence or absence of a preceding car in the images as picked up is performed after the image signals have been transferred to a memory 45. After a profile emphasis processing, for example, in which the profile of each image is emphasized, an image on the screen of a display, which is symmetrical with respect to a vertical center line thereof, is extracted to find the image of the preceding car. In this respect, a car in general is symmetrical with its vertical center line. Then, it is determined whether the symmetrical image lies substantially at the center of the screen. If the answer is negative, it is determined that the symmetrical image is not the image of a preceding vehicle, that is there is no preceding vehicle. If, however, the answer is positive, it is determined that the symmetrical image is the image of a preceding vehicle. In this case, a window is set on the screen for the extracted image, and the distance to the extracted image is arithmetically calculated from the images sensed by the sensors 42 and 52 in accordance with the well-known trigonometric method. In this manner, the presence of a preceding car is recognized if the extracted image is of a size bearing an appropriate relation to the inter-vehicle distance thus measured.

Figure 14A:
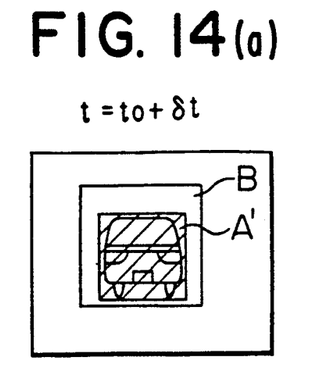
FIGS. 14(A), 14(B) and 14(C) are pictorial views for illustrating the operation of the inter-vehicle distance sensor.
Figure 14B:
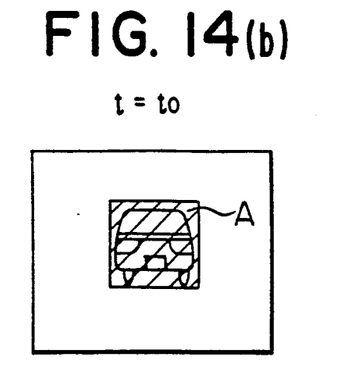

In the vehicle following mode, a window A is set for an image picked up at a time point $t=t_1$, as is illustrated in FIG. 14 (A). The image in the window A is stored in the memory 46. Thereafter, at a time point $t=t_1+\delta t$ (i.e. after the lapse of a short time $\delta t$), an image which best matches the image within the window A is searched from a range B which covers the window A and its neighboring or peripheral regions therearound, as shown in FIG. 14 (B). Then, a new or updated window A' having the best matching image located in the center thereof is formed. The best matching or updated image is transferred back or stored into the memory 46 to make preparation for freshly fetching new image data into the memory 44 at a succeeding time point. By repeating this operation on a time-serial basis, the vehicle following operation can be carried out.

Figure 14C:
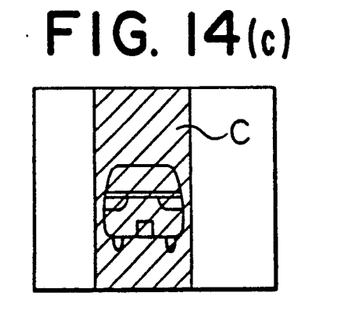

Furthermore, by progressively superposing an image A' picked up by the upper camera with that of the lower camera within a region C, FIG. 14 (C), while shifting these images relative to each other little by little or in a stepwise manner, it is possible to arithmetically determine the distance to an object corresponding to the image A' by means of the trigonometric method on the basis of a deviation or amount of shift which gives the best match between the above two images.

By virtue of the automatic preceding-car recognition and follow-up travel control described above, the alarm 31 is automatically activated upon abnormally close approach to a preceding car to thereby alert the driver of the situation. In that case, the driver may depress the brake pedal for decelerating the vehicle or pass the preceding car ahead. Alternatively, the driver may turn on the confirmation switch 32 to thereby allow the control unit to control the vehicle speed so that the vehicle of concern can follow the preceding car while maintaining a predetermined inter-vehicle distance therebetween. In addition, when the preceding car takes a different road at a branch or changes the traveling direction so that the inter-vehicle distance becomes by far greater than a predetermined value, the follow-up travel control mode is deactivated to allow the motor vehicle to run at a current speed.

Figure 11:
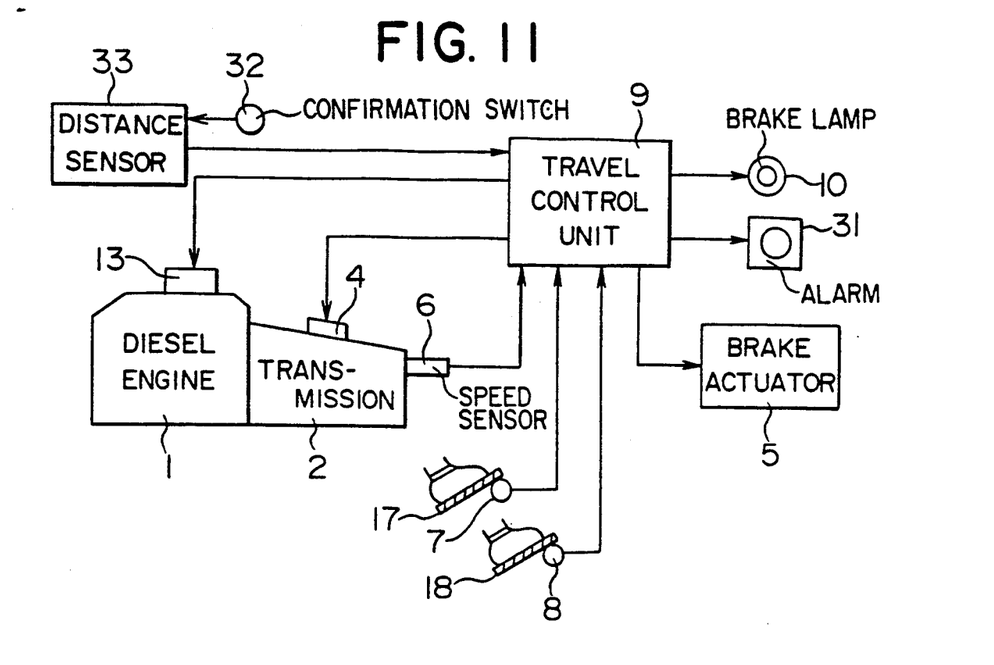
FIG. 11 schematically shows the structure of a vehicle travel control apparatus according to an eleventh embodiment of the invention.
Figure 12:
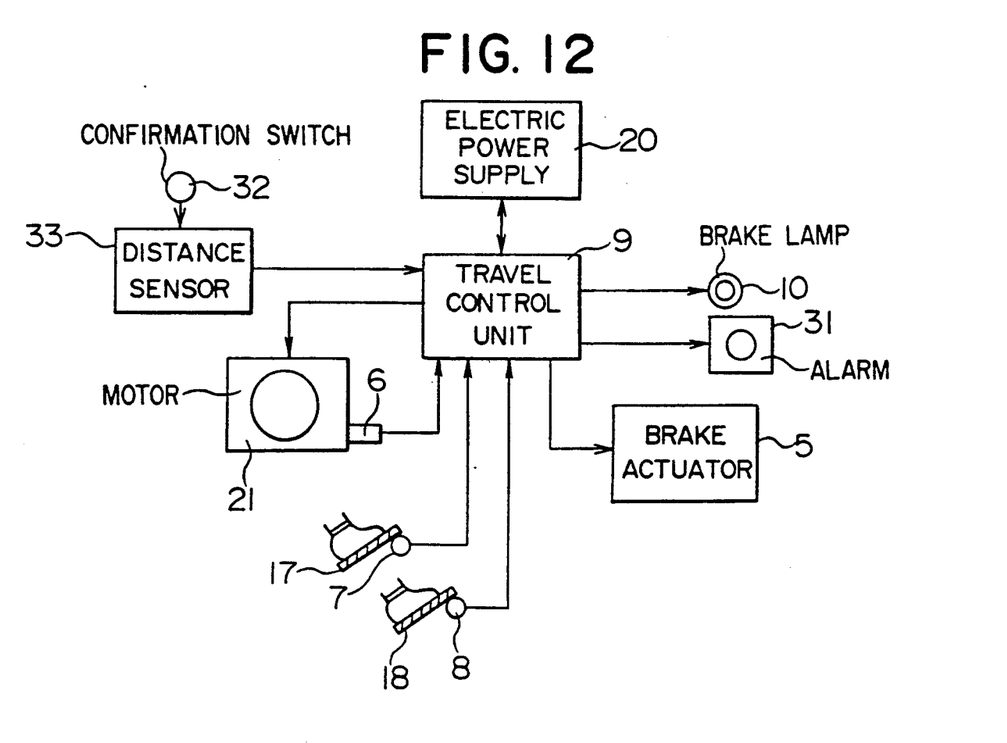
FIG. 12 schematically shows the structure of a travel control apparatus according to a twelfth embodiment of the invention.

FIGS. 11 and 12 show an eleventh and a twelfth embodiment of the invention which correspond to the second and the third embodiment, respectively, except that the former are additionally provided with a control function similar to that described above in conjunction with the tenth embodiment.

As will be appreciated from the foregoing description, the vehicle travel control apparatus according to the invention can control to accelerate or decelerate the vehicle in accordance with an acceleration or deceleration command input by the driver while maintaining the current vehicle speed upon stoppage of the acceleration or deceleration. As a result, the vehicle control to be performed by the driver can be substantially simplified, thereby reducing the danger in driving which would otherwise be caused due to carelessness of the driver. Besides, the control apparatus of the invention allows the vehicle to keep a desired target vehicle speed with high accuracy over a wide speed range from zero to a high speed regardless of uphill or downhill running, loads, and like other travelling conditions.

Furthermore, when an obstacle is detected in the course of travelling, an alarm is generated to assure enhanced safety for the vehicle operation.

Additionally, when the motor vehicle approaches an obstacle in the course of travelling at a speed lower than a predetermined value, the inter-vehicle distance is automatically controlled to protect the vehicle against the possibility of collision with the obstacle.

At the time when the vehicle is abnormally approaching a preceding car to an excessive extent, an alarm is generated to alert the driver for confirmation. In this case, the apparatus is switched into a preceding car follow-up operation with inter-vehicle distance control, so that a predetermined appropriate inter-vehicle distance to the preceding car can automatically be maintained, thus positively preventing the motor vehicle against collision therewith.

The many features and advantages of the invention are apparent from the detailed description of the specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling within the scope of the invention.

What is claimed is:

1. A travel control apparatus for a motor vehicle, comprising:
   means for generating an acceleration command in response to a driver's accelerator pedal depression;

means for generating a deceleration command in response to the driver's brake pedal depression;

means for detecting the speed of said motor vehicle; and control means responsive to the acceleration command and the deceleration command for respectively accelerating and decelerating said motor vehicle, said control means being operable to store the detected speed of said motor vehicle at the instant when said acceleration command or said deceleration command is terminated by the driver's release of the accelerator pedal or the brake pedal, respectively, and to control said motor vehicle in such a manner that the speed of said vehicle is maintained at the stored speed upon termination of the acceleration or deceleration command.

2. A vehicle travel control apparatus according to claim 1, further comprising:

means for detecting an obstacle on a road on which said vehicle is travelling; and means for generating an alarm upon detection of said obstacle.

3. A vehicle travel control apparatus according to claim 1, further comprising:

means for detecting a distance to an obstacle located within a predetermined range in front of said motor vehicle; and means for controlling the distance between said motor vehicle and said obstacle when and after the driver stops the acceleration or deceleration operation if the distance to said obstacle becomes smaller than a predetermined value during the time when said motor vehicle is travelling at a speed lower than a predetermined value.

4. A vehicle travel control apparatus according to claim 1, further comprising:

a distance sensor for detecting a preceding vehicle and determining an inter-vehicle distance thereto;

means for generating an alarm when the inter-vehicle distance decreases below a predetermined value; and a confirmation switch adapted to be operated by the driver when said inter-vehicle distance becomes smaller than a predetermined value, to select an inter-vehicle distance control mode in which the distance to the preceding vehicle is automatically maintained constant;

wherein said control means is responsive to an operation of said confirmation switch for maintaining the inter-vehicle distance at a constance level while allowing said motor vehicle to follow said preceding vehicle.

* * * * *